(12) United States Patent
Akamatsu et al.

(10) Patent No.: US 12,157,357 B2
(45) Date of Patent: Dec. 3, 2024

(54) VEHICLE

(71) Applicant: SUBARU CORPORATION, Tokyo (JP)

(72) Inventors: Takashi Akamatsu, Tokyo (JP); Muneyuki Maiguma, Tokyo (JP); Takahiro Matsuda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/404,656

(22) Filed: Jan. 4, 2024

(65) Prior Publication Data

US 2024/0239169 A1 Jul. 18, 2024

(30) Foreign Application Priority Data

Jan. 18, 2023 (JP) ................................. 2023-005867

(51) Int. Cl.
*B60K 1/00* (2006.01)
*B62D 21/15* (2006.01)
*B62D 25/08* (2006.01)
*B62D 25/10* (2006.01)

(52) U.S. Cl.
CPC .............. *B60K 1/00* (2013.01); *B62D 21/155* (2013.01); *B62D 25/082* (2013.01); *B62D 25/10* (2013.01)

(58) Field of Classification Search
CPC ....... B60K 5/1275; B60K 1/00; B60L 3/0007; B62D 25/082

USPC ................................................... 180/312, 232
See application file for complete search history.

(56) References Cited

U.S. PATENT DOCUMENTS

| | | | | |
|---|---|---|---|---|
| 6,722,696 | B2* | 4/2004 | Sonomura | B60K 5/1216 180/312 |
| 8,459,399 | B2* | 6/2013 | Ohashi | B60L 7/16 180/312 |
| 9,371,009 | B2* | 6/2016 | Ishikawa | H01M 8/2457 |
| 9,963,171 | B2* | 5/2018 | Nagaosa | B62D 27/02 |
| 10,518,620 | B2* | 12/2019 | Yamafuji | B60K 1/04 |
| 11,104,383 | B2* | 8/2021 | Chikazawa | B62D 21/11 |
| 2016/0297290 | A1* | 10/2016 | Murata | B60K 1/04 |

FOREIGN PATENT DOCUMENTS

JP 2014-125171 A 7/2014

* cited by examiner

*Primary Examiner* — James A English
*Assistant Examiner* — Tiffany L Webb
(74) *Attorney, Agent, or Firm* — TROUTMAN PEPPER HAMILTON SANDERS LLP

(57) ABSTRACT

A vehicle includes a motor, an electrical component, and a support device. The motor is supported by a first mount in such a manner as to be rotatable with a rotary shaft serving as a center of rotation, and the rotary shaft extends in a lateral direction at a predetermined position on a lower side. The electrical component is coupled to the motor. The support device is configured to support the electrical component above the motor and move the electrical component upward and rearward in response to rotation of the motor.

6 Claims, 7 Drawing Sheets

VEHICLE

CROSS-REFERENCE TO RELATED APPLICATION

The present application claims priority from Japanese Patent Application No. 2023-005867 filed on Jan. 18, 2023, the entire contents of which are hereby incorporated by reference.

BACKGROUND

The disclosure relates to a vehicle including a motor and an electrical component.

In the related art, there has been proposed a vehicle in which an inverter is fixed on a slide mechanism that is held so as to be slidable toward the rear side of the vehicle (see, for example, Japanese Unexamined Patent Application Publication No. 2014-125171). In the event of a frontal collision of this vehicle, the slide mechanism causes the inverter to slide toward the rear side of the vehicle, so that the probability of damage to the inverter can be reduced.

SUMMARY

An aspect of the disclosure provides a vehicle including a motor, an electrical component, and a support device. The motor is supported by a first mount in such a manner as to be rotatable with a rotary shaft serving as a center of rotation, and the rotary shaft extends in a lateral direction at a predetermined position on a lower side. The electrical component is coupled to the motor. The support device is configured to support the electrical component above the motor and move the electrical component upward and rearward in response to rotation of the motor.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In a vehicle that travels by using the power of a motor, the motor, an inverter, and so forth are accommodated in a motor room (in a room covered with a hood). In the event of a frontal collision of such a vehicle, if the motor is displaced as a result of collapse of the motor room, there is a possibility that the displaced motor may damage the inverter or other components.

It is desirable to improve safety.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
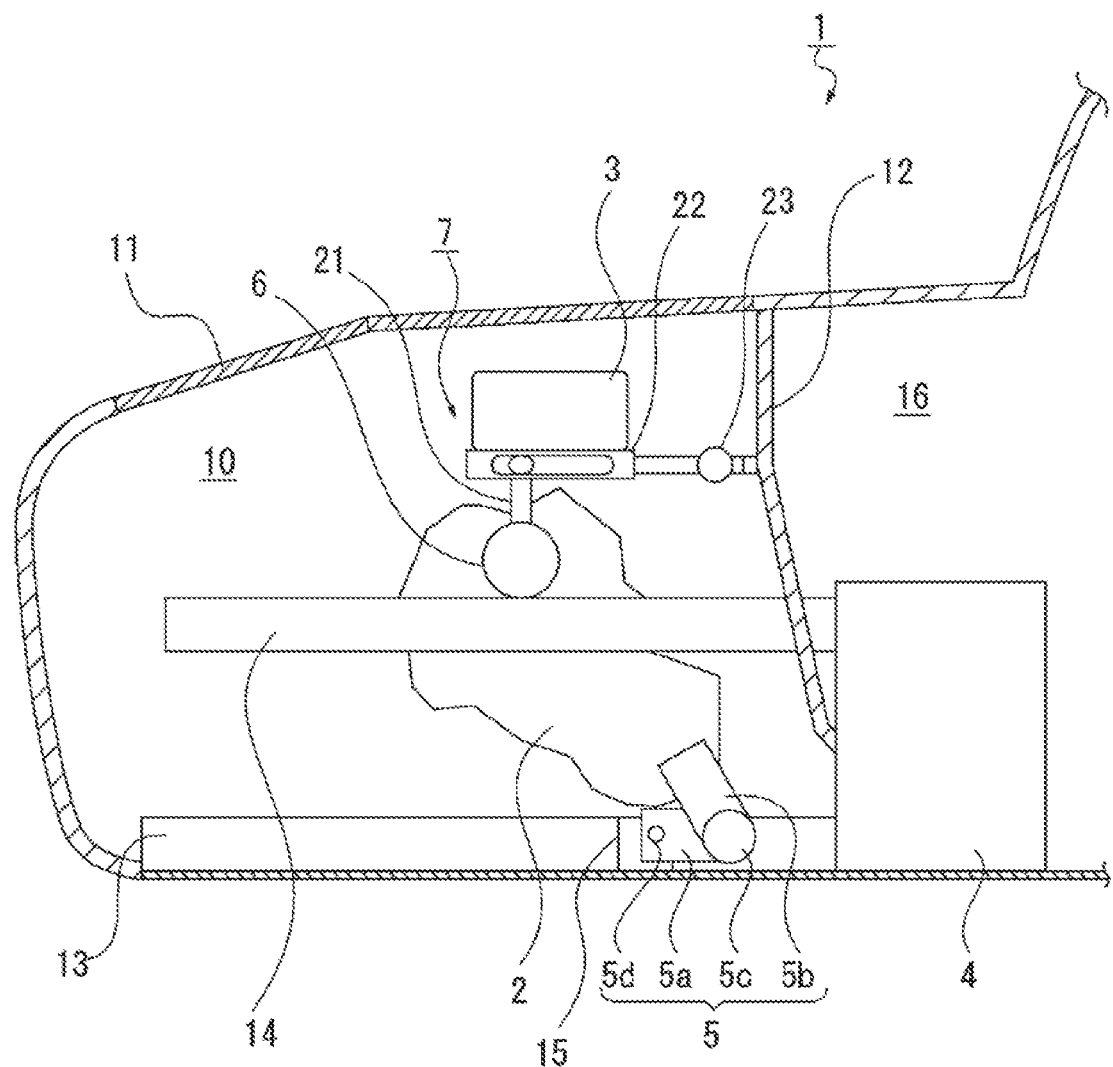
FIG. 1 is a diagram illustrating an overview of the configuration of a vehicle.

FIG. 1 is a diagram illustrating an overview of the configuration of a vehicle 1 according to the embodiment. In the following description, a traveling direction of the vehicle 1 will be defined as a forward direction. The direction in which the vehicle 1 moves rearward will be defined as a rearward direction. The direction toward the right-hand side in the traveling direction of the vehicle 1 will be defined as a rightward direction. The direction toward the left-hand side in the traveling direction of the vehicle 1 will be defined as a leftward direction. The direction toward the vertically upper side will be defined as an upward direction. The direction toward the vertically lower side will be defined as a downward direction.

As illustrated in FIG. 1, the vehicle 1 is an electric automobile that includes a motor 2 serving as a power source. The vehicle 1 includes the motor 2, an inverter 3, and a battery 4.

The motor 2 and the inverter 3 are accommodated in a motor room 10 at the front of the vehicle 1. The motor room 10 is surrounded by a hood 11, a dash panel 12, a pair of side members 13, a pair of side frames 14, and so forth.

The battery 4 is disposed behind the dash panel 12 and, for example, below a cabin 16.

The motor 2 is, for example, a three-phase alternating-current motor and is electrically coupled to the battery 4 via the inverter 3. The motor 2 generates power by receiving electrical power that is supplied from the battery 4 via the inverter 3. The motor 2 transmits the generated power to driving wheels so as to cause the vehicle 1 to travel.

The motor 2 generates electricity (electric power) by performing a regenerative operation. The electricity generated by the regenerative operation of the motor 2 is supplied to the battery 4 via the inverter 3.

The motor 2 is supported by a cross member 15 via a first mount 5 and also supported by the left and right side frames 14 via two second mounts 6. The cross member 15 extends between the side members 13. Thus, the motor 2 is supported at three points on a vehicle body of the vehicle 1 via the first mount 5 and the two second mounts 6.

The inverter 3 converts a direct current supplied from the battery 4 into a three phase alternating current and supplies the alternating current to the motor 2. When the motor 2 performs a regenerative operation, the inverter 3 converts an alternating current supplied from the motor 2 into a direct current and supplies the direct current to the battery 4.

The battery 4 is a so-called high-voltage battery and can store electricity to be supplied to the motor 2.

The hood 11 has a structure in which a center portion of the hood 11 in the longitudinal direction of the vehicle 1 is bendable in the upward direction.

The dash panel 12, the pair of side members 13, the pair of side frames 14, and the cross member 15 correspond to the vehicle body (a body).

The dash panel 12 is, for example, a metal plate that isolates the motor room 10 from the cabin 16 in which an occupant is to be accommodated.

The side members 13 are members each of which is disposed on the lower side of the vehicle 1 so as to extend in the longitudinal direction and are disposed side by side in the lateral direction (a width direction of the vehicle 1). Cross members are disposed such that each of them extends between the pair of side members 13. The cross member 15 is one of these cross members and is disposed below the motor 2.

The first mount 5 is formed of a rod mechanism (a link mechanism) and includes two rods 5a and 5b, a joint mechanism 5c, and a support mechanism 5d. The rod 5a is rotatably coupled to substantially the center of the cross member 15 in the lateral direction via the support mechanism 5d. The support mechanism 5d includes a rotary shaft extending in the lateral direction and supports the rod 5a in such a manner that the rod 5a is rotatable around the rotation axis.

The support mechanism 5d supports one end of the rod 5a, and the rod 5a extends in the rearward direction from the one end to the other end thereof. The rod 5b is rotatably coupled to the other end of the rod 5a via the joint mechanism 5c.

The joint mechanism 5c includes a rotary shaft extending in the lateral direction and supports the rods 5a and 5b in such a manner that each of the rods 5a and 5b is rotatable around this rotation axis. In other words, the joint mechanism 5c supports the rods 5a and 5b in such a manner that the rod 5b is rotatable around the rotary shaft with respect to the rod 5a.

The joint mechanism 5c supports one end of the rod 5b, and the rod 5b extends obliquely forward and upward from the one end to the other end thereof. The other end of the rod 5b is coupled to the lower side of the motor 2.

In this manner, the motor 2 is supported on its lower side by the cross member 15 via the first mount 5.

Each of the side frames 14 is disposed above a corresponding one of the side members 13 and extends in the longitudinal direction. The side frames 14 are disposed side by side in the lateral direction (the width direction).

Each of the second mounts 6 has a columnar shape and is fixed on a corresponding one of the side frames 14 with a fastening bolt or the like that is not illustrated. The second mounts 6 are coupled to the upper side of the motor 2 via mount arms 6a (see FIG. 6) each of which is disposed so as to extend in the lateral direction.

In this manner, the motor 2 is supported on its upper side by the left and right side frames 14 via the second mounts 6.

A support device 7 is attached to the second mounts 6. The support device 7 supports the inverter 3 above the motor 2.

Figure 2:
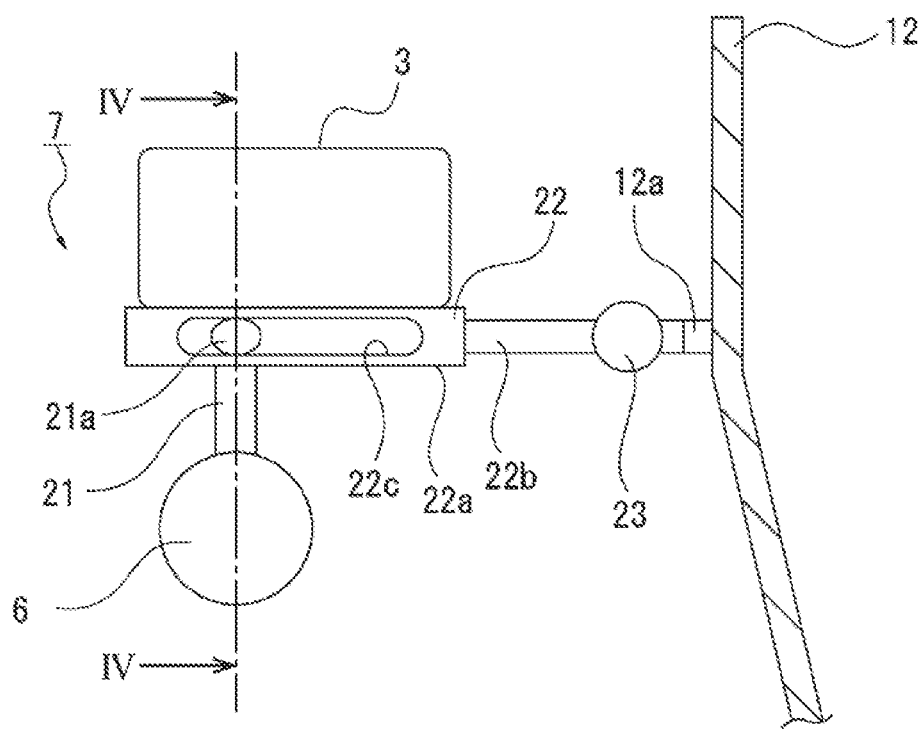
FIG. 2 is a side view of a support device.
Figure 3:
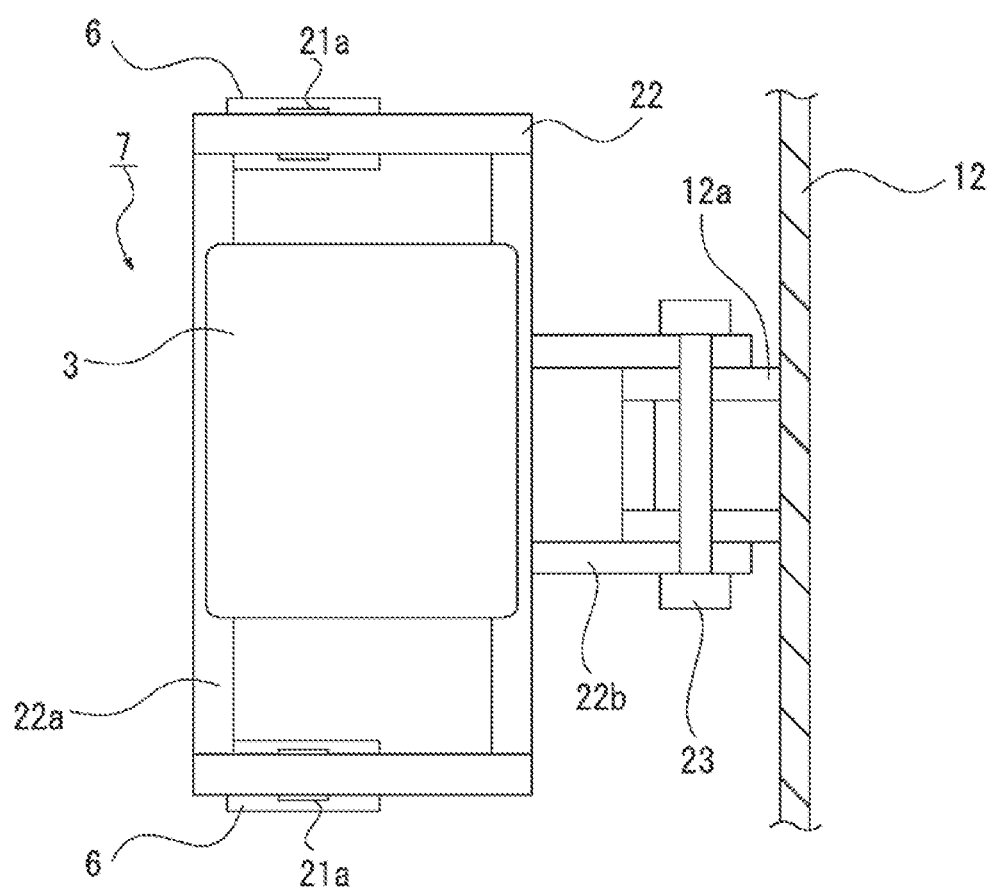
FIG. 3 is a top view of the support device.
Figure 4:
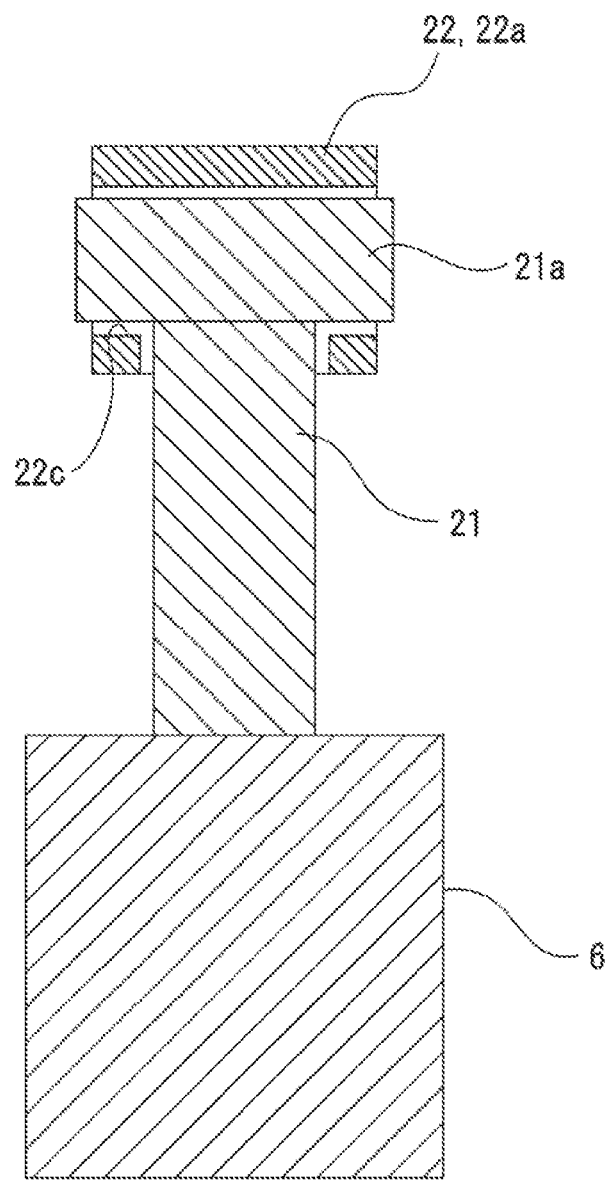
FIG. 4 is a cross-sectional view taken along line IV-IV of FIG. 2.

FIG. 2 is a side view of the support device 7. FIG. 3 is a top view of the support device 7. FIG. 4 is a cross-sectional view taken along line IV-IV of FIG. 2. Note that FIG. 4 does not illustrate the inverter 3 and partially illustrates the cross-section taken along line IV-IV.

As illustrated in FIG. 2 to FIG. 4, the support device 7 includes movable frames 21, a main frame 22, and pins 23.

Each of the movable frames 21 is attached on its lower end to a corresponding one of the second mounts 6. Pins 21a are each attached to the upper end of a corresponding one of the movable frames 21. The pins 21a each have a columnar shape and are disposed side by side in the lateral direction.

The main frame 22 includes a main frame body 22a and main frame shafts 22b. The main frame body 22a has a substantially quadrangular frame-like shape. Each of the main frame shafts 22b is disposed in such a manner as to extend in the rearward direction from the rear of the main frame body 22a.

The main frame body 22a includes a pair of frame shafts each of which extends in the lateral direction and another pair of frame shafts each of which extends in the longitudinal direction. These pairs of frame shafts are coupled to each other, so that the main frame body 22a has a substantially quadrangular shape.

The pair of frame shafts each of which extends in the longitudinal direction each have a through hole 22c. Each of the through holes 22c extends in the longitudinal direction. The pins 21a of the movable frames 21 each pass through a corresponding one of the through holes 22c and are each slidable in the longitudinal direction in the corresponding through hole 22c.

Therefore, the movable frames 21 are engaged with the main frame 22 so as to be slidable in the longitudinal direction.

The rear side of each of the main frame shafts 22b is rotatably supported on the dash panel 12 by a corresponding one of the pins 23. The dash panel 12 includes supports 12a each of which projects forward.

One of the pins 23 passes through a through hole in one of the supports 12a and a through hole in the corresponding main frame shaft 22b. The other of the pins 23 passes through a through hole in the other of the supports 12a and a through hole in the corresponding main frame shaft 22b. As a result, each of the pins 23 extends in the lateral direction. Thus, the pins 23 serve as rotary shafts each extending in the lateral direction and support the main frame 22 such that the main frame 22 is rotatable around the rotary shafts with respect to the dash panel 12.

The inverter 3 is mounted on the main frame body 22a. In this manner, the inverter 3 is supported on the motor 2 with the main frame 22 interposed therebetween in the motor room 10.

Figure 5:
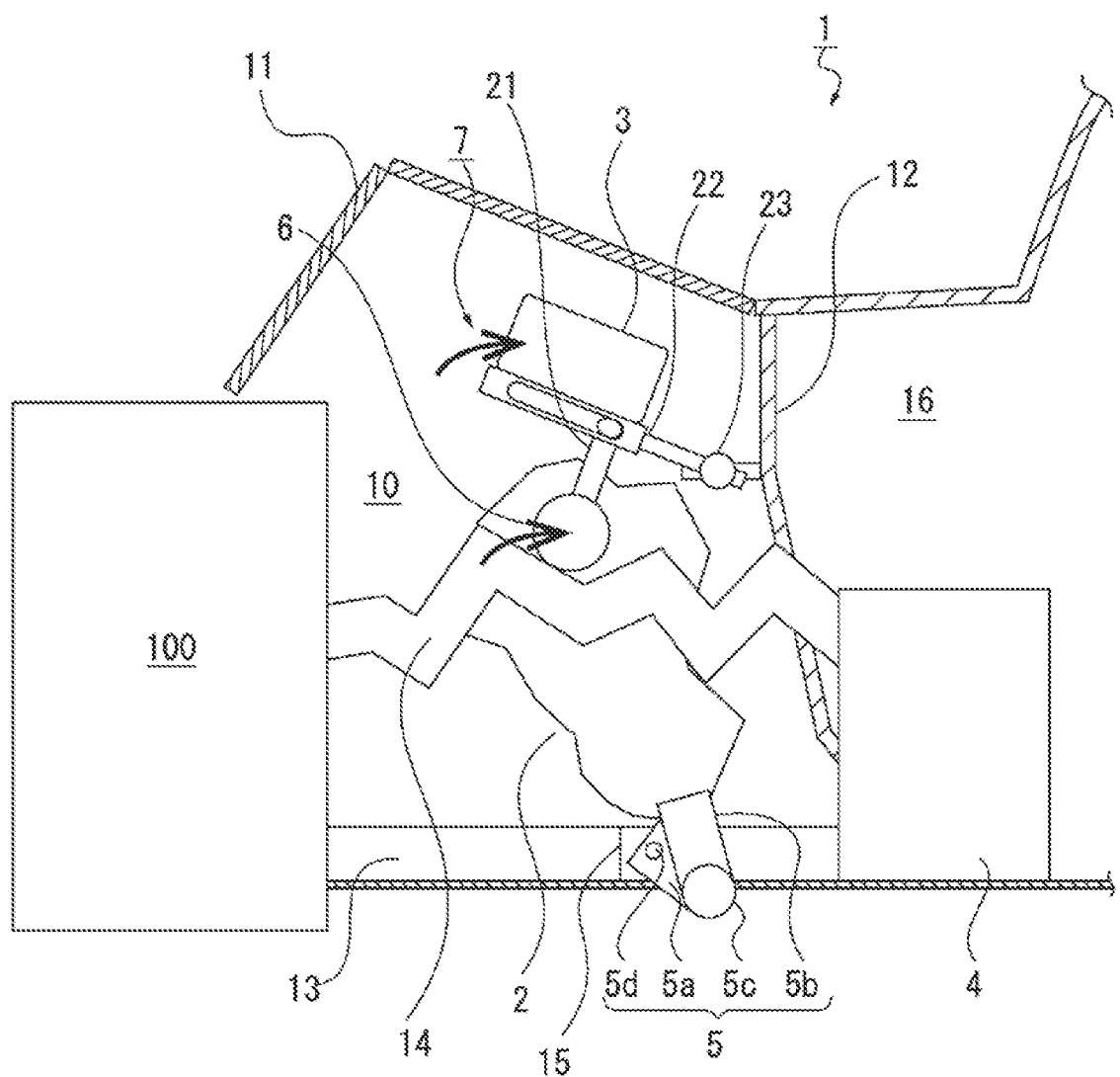
FIG. 5 is a diagram illustrating a motor room in the event of a frontal collision.
Figure 6:
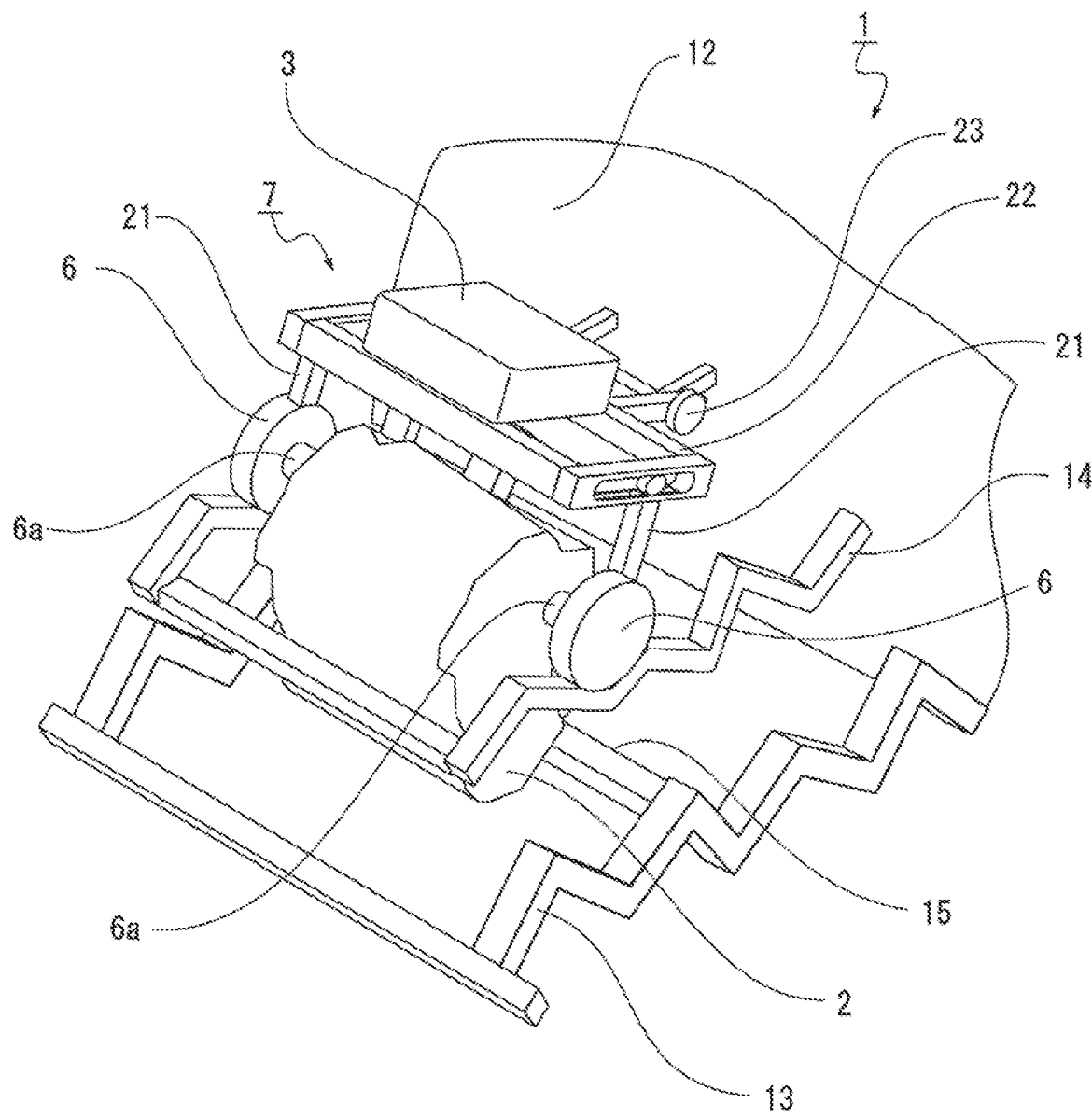
FIG. 6 is a perspective view illustrating the motor room in the event of the frontal collision.
Figure 7:
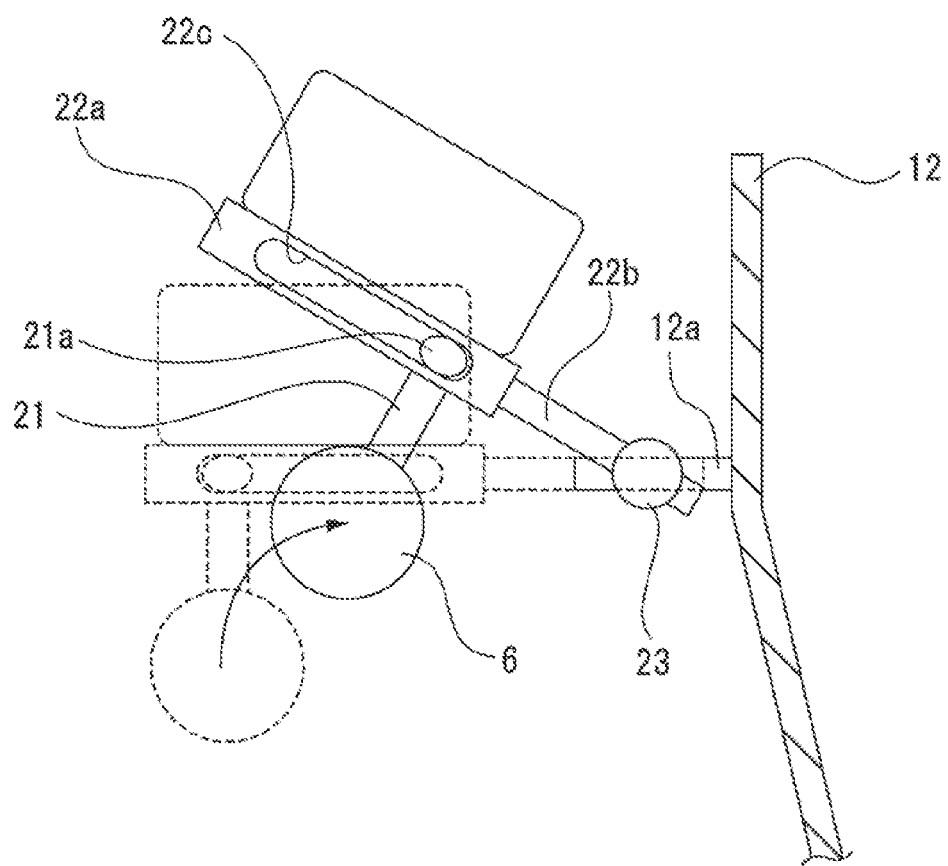
FIG. 7 is a diagram illustrating the support device in the event of the frontal collision.

FIG. 5 is a diagram illustrating the motor room 10 in the event of a frontal collision. FIG. 6 is a perspective view illustrating the motor room 10 in the event of the frontal collision. FIG. 7 is a diagram illustrating the support device 7 in the event of the frontal collision. As illustrated in FIG. 5 and FIG. 6, when the vehicle 1 collides with an obstacle 100 from the front, the motor room 10 may sometimes become crushed in the longitudinal direction by the obstacle 100.

When the motor room 10 is crushed in the longitudinal direction, the side frames 14 collapse in such a manner as to be compressed in the longitudinal direction. In this case, the second mounts 6, which are fixed to their respective side frames 14, move rearward or move upward and rearward concomitantly with the collapse of the side frames 14.

When the second mounts 6 move rearward or move upward and rearward, the motor 2, which is supported by the second mounts 6, rotates in a clockwise direction in FIG. 5 with the support mechanism 5d of the first mount 5 serving as the center of rotation. As the motor 2 rotates in the clockwise direction, the upper side thereof follows a rotation path extending upward and rearward as indicated by an arrow in FIG. 5.

In this case, since the lower side of the motor 2 is coupled to the first mount 5, the motor 2 does not move rearward.

Thus, the motor 2 can avoid contact with the battery 4 that is disposed behind the motor 2. Therefore, in the vehicle 1, the probability of damage to the battery 4 can be reduced.

As illustrated in FIG. 5, FIG. 6, and FIG. 7, when the second mounts 6 move rearward or move upward and rearward, the movable frames 21 of the support device 7 move rearward or move upward and rearward together with the second mounts 6.

In this case, the pins 21a slide in the rearward direction along their respective through holes 22c. When the pins 21a slide in the rearward direction, the main frame 22 rotates in the clockwise direction in FIG. 5 with the pins 23 serving as the center of rotation. As the main frame 22 rotates in the clockwise direction, the main frame body 22a follows a rotation path extending upward and rearward.

Then, the inverter 3, which is mounted on the main frame 22, rotates in the clockwise direction in FIG. 5 in such a manner as to follow, together with the main frame body 22a, a rotation path extending upward and rearward as indicated by an arrow in FIG. 5.

In other words, in the vehicle 1, the upper side of the motor 2 rotates in such a manner as to follow a rotation path extending upward and rearward, and also the inverter 3 rotates in such a manner as to follow a rotation path extending upward and rearward.

As described above, in the event of a frontal collision of the vehicle 1, both the motor 2 and the inverter 3 rotate in such a manner as to follow a rotation path extending upward and rearward, and thus, the positional relationship (the relative distance) between the motor 2 and the inverter 3 can be maintained.

In addition, in the vehicle 1, when the motor room 10 is crushed in the longitudinal direction by the obstacle 100, the center portion of the hood 11 is bent in the upward direction, so that a space for the inverter 3 to rotate and move upward and rearward can be ensured.

As a result, in the vehicle 1, the probability of damage to the inverter 3 due to contact between the inverter 3 and the motor 2 or between the inverter 3 and the hood 11 can be reduced. In addition, in the vehicle 1, since the probability of damage to the inverter 3 can be reduced, the probability of leakage of current from the inverter 3 can also be reduced.

Although the embodiment according to the disclosure has been described above, the disclosure is not limited to the above-described specific example, and various configurations may be employed.

For example, in the above-described embodiment, the support device 7 includes the movable frames 21, the main frame 22, and the pins 23. However, the structure of the support device 7 is not limited to this as long as the support device 7 supports the inverter 3 above the motor 2 and moves the inverter 3 upward and rearward when the upper side of the motor 2 rotates upward and rearward.

In the above-described embodiment, the support device 7 is attached to the second mounts 6. However, the support device 7 may be separated from the second mounts 6 as long as the support device 7 supports the inverter 3 above the motor 2 and moves the inverter 3 upward and rearward along with rotation of the motor 2.

In the above-described embodiment, the second mounts 6 are displaced rearward or displaced upward and rearward as a result of the side frames 14 being compressed in the longitudinal direction in the event of a frontal collision, so that the motor 2 and the support device 7 rotate. However, the motor 2 may rotate by being pushed to the rear side by the obstacle 100 in the event of a frontal collision, and this rotation of the motor 2 may cause the support device 7 to rotate.

As described above, the vehicle 1 of the embodiment includes the motor 2, an electrical component (the inverter 3), and the support device 7. The motor 2 is supported by the first mount 5 so as to be rotatable with the rotary shaft (the support mechanism 5d), which extends in the lateral direction at a predetermined position on the lower side, serving as the center of rotation. The electrical component is coupled to the motor 2. The support device 7 supports the electrical component above the motor 2 and moves the inverter 3 upward and rearward with rotation of the motor 2. Note that the inverter 3 is an example of the electrical component.

As a result, in the event of a frontal collision of the vehicle 1, the upper side of the motor 2 rotates in such a manner as to follow a rotation path extending upward and rearward, and thus, the vehicle 1 can reduce the probability that the motor 2 will come into contact with the battery 4, which is disposed behind the motor 2.

In addition, even if the upper side of the motor 2 rotates upward and rearward, the positional relationship between the motor 2 and the inverter 3 can be maintained by the support device 7. Thus, the vehicle 1 can reduce the probability of damage to the inverter 3 due to contact between the inverter 3 and the motor 2.

Therefore, the vehicle 1 can reduce the probability of leakage of current from the inverter 3 and can improve the safety.

The motor 2 is supported on its upper side by the vehicle body (the side frames 14) via the second mounts 6, and the support device 7 is coupled to the second mounts 6.

Thus, in the event of a frontal collision of the vehicle 1, the second mounts 6 cause the support device 7 to rotate and move upward and rearward. Then, the support device 7 moves the inverter 3 upward and rearward.

As a result, in the vehicle 1, the upward and rearward rotational movement of the support device 7 with the rotational movement of the motor 2 and the upward and rearward movement of the inverter 3 simultaneously occur, and thus, the positional relationship between the motor 2 and the inverter 3 can be maintained with a simple configuration.

The support device 7 is rotatably supported by the vehicle body (the dash panel 12) on the rear side.

Thus, in the event of a frontal collision of the vehicle 1, the support device 7 can cause the inverter 3 to rotate and move upward and rearward by rotating around the pins 23, which are disposed on the dash panel 12.

In addition, the support device 7 includes the movable frames 21, each of which is coupled to the corresponding second mount 6, and the main frame 22, on which the inverter 3 is disposed. The movable frames 21 are engaged with the main frame 22 so as to be slidable in the longitudinal direction.

Thus, when the second mounts 6 move rearward or move upward and rearward, the movable frames 21 move rearward or move upward and rearward together with the second mounts 6. In this case, the movable frames 21 push the main frame 22 upward and rearward while sliding with respect to the main frame 22. In this manner, the support device 7 can move the inverter 3 upward and rearward with a simple configuration.

The motor 2, the inverter 3, and the support device 7 are disposed in the motor room 10, and the hood 11 for opening and closing the motor room 10 includes the center portion in the longitudinal direction that is bendable in the upward direction.

Thus, when the center portion of the hood 11 is bent in the upward direction, a space for the inverter 3 to rotate and move upward and rearward can be ensured, and the probability of damage to the inverter 3 due to contact between the inverter 3 and the hood 11 can be reduced.

Thus, even if the motor is displaced in the event of a frontal collision of the vehicle, the vehicle can reduce the probability that the motor will come into contact with the electrical component by maintaining the relative distance between the motor and the electrical component.

According to the disclosure, safety can be improved.

The invention claimed is:

1. A vehicle comprising:
a motor that is supported by a first mount in such a manner as to be rotatable with a rotary shaft serving as a center of rotation, the rotary shaft extending in a lateral direction at a predetermined position on a lower side;
an electrical component that is coupled to the motor; and
a support device configured to support the electrical component above the motor and move the electrical component upward and rearward in response to rotation of the motor.

2. The vehicle according to claim 1,
wherein the motor is supported on an upper side of the motor by a vehicle body via a second mount, and
wherein the support device is attached to the second mount.

3. The vehicle according to claim 2,
wherein the support device is rotatably supported by the vehicle body on a rear side of the support device.

4. The vehicle according to claim 2,
wherein the support device comprises
a movable frame that is attached to the second mount, and
a main frame on which the electrical component is disposed, and
wherein the movable frame is engaged with the main frame in such a manner as to be slidable in a longitudinal direction of the vehicle.

5. The vehicle according to claim 2,
wherein the motor, the electrical component, and the support device are disposed in a motor room, and
wherein a hood for opening and closing the motor room has a center portion in the longitudinal direction, the center portion being bendable in an upward direction.

6. The vehicle according to claim 1,
wherein the motor, the electrical component, and the support device are disposed in a motor room, and
wherein a hood for opening and closing the motor room has a center portion in the longitudinal direction, the center portion being bendable in an upward direction.

* * * * *